United States Patent [19]
MacNamee et al.

[11] 4,447,346
[45] May 8, 1984

[54] ELECTROLYTE SYSTEM FOR ELECTROLYTIC CAPACITORS

[75] Inventors: Richard W. MacNamee, Pickens; Morris T. Reese, Taylors; Emil F. Blase, Pickens, all of S.C.

[73] Assignee: Sangamo Weston, Inc., Springfield, Ill.

[21] Appl. No.: 467,946

[22] Filed: Feb. 18, 1983

Related U.S. Application Data

[63] Continuation of Ser. No. 12,321, Feb. 15, 1979, abandoned, which is a continuation of Ser. No. 841,181, Oct. 11, 1977, abandoned.

[51] Int. Cl.$^3$ .............................................. H01G 9/02
[52] U.S. Cl. .................................. 252/62.2; 361/433
[58] Field of Search ....................... 252/62.2; 361/433

[56] References Cited

U.S. PATENT DOCUMENTS

| | | | |
|---|---|---|---|
| 3,518,499 | 6/1970 | Shepherd et al. | 252/62.2 X |
| 3,547,423 | 12/1970 | Jenny et al. | 252/62.2 X |
| 3,812,039 | 5/1974 | Niwa | 252/62.2 |
| 3,835,055 | 9/1974 | Chesnot | 252/62.2 |

FOREIGN PATENT DOCUMENTS

| | | | |
|---|---|---|---|
| 1805383 | 5/1970 | Fed. Rep. of Germany | 252/62.2 |
| 7005567 | 10/1970 | Netherlands | 252/62.2 |

*Primary Examiner*—Jack Cooper
*Attorney, Agent, or Firm*—Emrich & Dithmar

[57] ABSTRACT

An essentially non-aqueous electrolyte composition for aluminum-anode capacitors is disclosed comprising ethylene glycol and a salt such as the ammonium or amine salt of an unsaturated dicarboxylic acid with or without a small amount of an additive such as boric acid, phosphoric acid, ammonium dihydrogen phosphate, ammonium pentaborate, ammonium phosphate and mixtures thereof. The electrolyte offers high electrical conductivity, and greatly increased stability and shelf life, under conditions of no voltage, for low voltage capacitors having high capacitance ratings. In one embodiment, the combination of ethylene glycol, as the solvent, with between about 0.001 to 0.1 mole of unsaturated dicarboxylic acid per mole of ethylene glycol and about 0.001 to 0.1 mole of the salt per mole of ethylene glycol is used. Other embodiments are disclosed.

4 Claims, 1 Drawing Figure

ELECTROLYTE SYSTEM FOR ELECTROLYTIC CAPACITORS

This is a continuation of application Ser. No. 12,321 filed Feb. 15, 1979 which is a continuation of application Ser. No. 841,181 filed Oct. 11, 1977, both now abandoned.

BACKGROUND OF THE INVENTION

The shelf life of electrolyte compositions for capacitors has been a problem for over 40 years. Most of the research has been directed to the formation of an adequate seal for the oxide film on the anode electrode which is covered by a skin or film of an oxide produced by anodic oxidation which functions as a dielectric. The purpose of the seal is to make the anode less susceptible to degradation by hydration of the oxide.

B. Chesnot, in U.S. Pat. Nos. 3,546,119 and 3,638,077, discloses an electrolyte for single and multiple aluminum electrode capacitors comprising about 0.5 to 10 moles of boric acid per 11 moles of a solvent such as gamma-butyrolactone, gamma-valerolactone and N-methylpyrrolidone. Chesnot's compositions can contain between 0.1 to 2 moles of a trialkylamine per mole of the solvent. The anion generating agent may be such acids as acetic, acrylic, butyric and citric acids. These compositions are substantially non-aqueous but are dependent on the presence of a small amount of water necessary to reform the anode (oxide) layer produced in situ by the dehydration of boric acid into metaboric acid and water. Without this water balance the electrolyte is subject to premature destruction through self-sustained elevation of the leakage current or an unwanted change in the electrical characteristics of the capacitor. Such compositions also require the presence of the aforementioned anode-generating acids in order to attain lowered resistivity. Ethylene glycol is incorporated in the compositions of the '077 patent as a solubilizer.

U.S. Pat. No. 3,835,055, by B. Chesnot, discloses an aqueous electrolyte for aluminum-anode capacitors which is composed of maleic acid, a maleate of N-methylbutylamine, triethylamine or tributylamine and phosphoric acid dissolved in dimethylformamide (DMF) wherein the maleic acid and the maleate salt are present in an amount between $10^{-3}$ moles up to their up limits of solubility per mole of solvent (DMF) and the phosphoric acid is present in an amount between $10^{-3}$ to $10^{-1}$ moles per mole of solvent (DMF).

These compositions are described as being very slightly aqueous and function where low temperatures, high frequencies and possibly high temperatures in the order of at least 85° C. are encountered. Stability over a temperature range of −55° C. to +125° C. is disclosed. High faradic efficiency of the anodic oxidation and a limited service voltage, i.e. with maximum build-up voltage, are disclosed by Chesnot. Tests show that the combination of the maleic acid and its salt produces an electrical conductivity (mmho/cm at 35° C.) which is more than additive and that the addition of phosphoric acid raised the build-up voltage without affecting the electrical conductivity by more than 10%. Also, a small amount, i.e. 0.01% to 3% by weight of water and various lactones and DMF-ethylene glycol solvent combinations can be used with the phosphoric acid being an essential ingredient.

SUMMARY OF THE INVENTION

The instant invention provides electrolytes for capacitors, using ethylene glycol as the solvent, that are characterized by exhibiting only moderate changes in capacitance and dissipation factor and leakage currents that are not excessive when maintained at elevated temperatures, either with or without an applied voltage. Also, the compositions of this invention exhibit a leakage current factor K defined by the formula:

$$K = \frac{I_L (\mu a)}{\sqrt{MF \times V}}$$

which is below that of compositions using other solvents and well below a standard ammonium pentaborate electrolyte at 7.5 VDC, 300,000 MF, and well below this value at 100 hours and up to 500 hours or more shelf time (85° C.). The compositions of this invention have been tested at 60 VDC and 10,000 MF and found to exhibit long shelf life with a low K value. In the above formula, $I_L$=leakage current in microamps; MF=capacitance in microfarads; and V=applied DC voltage in volts.

These and other advantages of using the combination of ethylene glycol and a four carbon atoms unsaturated dicarboxylic acid in the form of an ammonium or $C_1$ to $C_4$ primary, secondary or tertiary amine salt will be described. Particular advantages are obtained using an electrolyte containing between about 0.001 to 0.1 mole of the acid, i.e. fumaric acid, per mole of ethylene glycol and between about 0.001 to 0.2 mole of the amine, i.e. triethylamine, per mole of ethylene glycol. From this the amount of the unsaturated acid is determined by the desired conductivity, and the amount of base required is sufficient to attain a final pH of about 4.9 to 7.2. Also, the electrolytes of this invention exhibit low voltage shelf lives that exceed the industry imposed standards of 300,000 MFD and 7.5 VDC, and exhibit very little change in 2000 hours.

DESCRIPTION OF THE DRAWING

The accompanying drawing is a graph of low voltage shelf life wherein the abscissa is the number of hours of storage at 85° C. and the ordinate is the K factor or leakage current factor.

DESCRIPTION OF PREFERRED EMBODIMENTS

In order to demonstrate the invention, a number of electrolytes were prepared and tested for low voltage shelf life as measured by the K factor (leakage current factor). The compositions are set forth in the following TABLE I.

TABLE I

| | ELECTROLYTE COMPOSITIONS | | |
|---|---|---|---|
| NO. | IDENTIFICATION | INGREDIENTS | AMOUNTS |
| 1. | (Standard glycol) 300,000 MF, 7.5 VDC | ethylene glycol boric acid ammonia | 16.13 mols. 4.71 mols. 0.95 mols. |
| 2. | (M-50) 300,000 MF, 7.5 VDC | ethylene glycol fumaric acid triethylamine | 1.32 mols. 0.054 mols. 0.11 mols. |

Composition No. 1 was prepared by mixing 16.13 mols. of ethylene glycol with 4.71 mols of boric acid and slowly adding 0.95 mols. of ammonia. The mixture is then heated until the boiling point reaches 125° C., the final pH is about 5.1 and the composition exhibits a resistivity of 940 ohm-centimeters at 30° C.

Composition No. 2 was prepared by mixing 1.32 mols. of ethylene glycol with 0.054 mols. of fumaric acid and slowly adding 0.11 mols. of triethylamine, while keeping the temperature below about 35° C. until the final pH is about 6.5 and the resistivity is 420 ohm-centimeters at 30° C.

A number of capacitors with service voltages of 7.5 V. with etched aluminum anodes were impregnated with each of the foregoing electrolytes after aging for four hours, and subjected to low voltage shelf life tests. The results are shown in the accompanying graph wherein the capacitors bear the same numbers as the aforesaid composition numbers.

Each point on the graph represents an average of ten (10) capacitance determination at the indicated hours exposure to a temperature of 85° C. Capacitors Nos. 1 and 2 were rated at 300,000 MFD.

The electrolytes formed in accordance with this invention employ ethylene glycol as the solvent containing the ammonium or amine salt of an unsaturated dicarboxylic acid represented by the cis and trans isomers, maleic and fumaric acid, maleic anhydride, and the methyl-substituted members of the series including citraconic acid, mesaconic acid, dimethyl maleic acid and dimethyl fumaric acid. In one embodiment the acids used contain two central, double-bonded carbon atoms irrespective of the length of the side chains. Also, mixtures of the dicarboxylic acids can be used, as well as their anhydrides.

The nitrogen-containing base, used to obtain a final pH of between about 4.9 to 7.2 can be ammonia or a $C_1$ to $C_4$ alkyl or alkylene-substituted primary, secondary or tertiary amine. Examples of such amines may be represented by the formulas:

$RNH_2$; $RR'NH$ and $RR'R''N$ wherein R, R' and R'' are hydrogen or $C_1$ to $C_4$ alkyl or alkylene groups and mixed alkyl or alkylene groups.

Specific examples of amines are methyl amine, dimethylamine, ethylamine, diethylamine, trimethylamine, n-propylamine, di-n-propylamine, triethylamine and n-butylamine. Other examples are the di- and tributylamines and the mixed alkyl amines N-methyl-n-butylamine, N-methylethylamine, the preferred amine being triethylamine. Mixtures of amines or an amine and ammonia can be used.

The following TABLE II lists additional examples of electrolyte compositions coming within the invention wherein the molar concentration of each ingredient is shown in parentheses:

TABLE II

| 1. | Ethylene glycol | (1.61 M) |
| | Maleic acid | (0.03 M) |
| | Ammonia | (0.03 M) |
| 2. | Ethylene glycol | (1.61 M) |
| | Maleic acid | (0.02 M) |
| | Ammonia | (0.064 M) |
| | Boric acid | (0.042 M) |
| 3. | Ethylene glycol | (1.61 M) |
| | Maleic acid | (0.06 M) |
| | Triethylamine | (0.06 M) |
| 4. | Ethylene glycol | (1.61 M) |
| | Maleic acid | (0.06 M) |
| | Triethylamine | (0.16 M) |
| | Phosphoric acid | (0.01 M) |
| 5. | Ethylene glycol | (1.61 M) |
| | Maleic acid | (0.06 M) |
| | Triethylamine | (0.06 M) |
| | Ammonium dihydrogen phosphate | (0.0087 M) |
| 6. | Ethylene glycol | (1.32 M) |
| | Fumaric acid | (0.054 M) |
| | Triethylamine | (0.11 M) |
| 7. | Ethylene glycol | (4.08 M) |
| | Fumaric acid | (0.052 M) |
| | Triethylamine | (0.13 M) |
| | Ammonium pentaborate | (0.008 M) |

It is noted that such additives as boric acid, phosphoric acid, ammonium dihydrogen phosphate and ammonium pentaborate have been included in some of the compositions of Table II. Such additives are included in small amounts of stability of the equivalent series resistance (ESR) as required for certain capacitors without substantially affecting the shelf life.

Contrary to expectation, it was found that the additives listed above had to be limited to less than 0.045 molar concentration to achieve the desired capacitor properties.

The pH of the compositions is adjusted to the indicated levels so that the corrosivity of the compositions to aluminum is eliminated.

In one embodiment of this invention an electrolyte for electrolytic capacitors having aluminum anodes is provided consisting essentially of the salt formed by the reaction of a dicarboxylic acid having the formula $$\text{HOOC}-\overset{R'}{\underset{}{C}}=\overset{R}{\underset{}{C}}-\text{COOH}$$

wherein R and R' are substituents of group consisting of hydrogen and $C_1$ to $C_4$ alkyl; and a base which may be ammonia or an amine of the formulas $R-NH_2$; $RR'NH$ and $RR'R''N$ wherein R, R' and R'' are hydrogen and $C_1$ to $C_4$ alkyl and alkylene groups dissolved in ethylene glycol, with the total molar concentration of the salt being about 0.3 per mole of ethylene glycol.

What is claimed is:

1. A substantially non-aqueous electrolyte composition for aluminum-anode electrolyte capacitors consisting essentially of ethylene glycol solvent and:
a reaction product formed at a temperature below about 35° C. in the presence of said ethylene glycol solvent when an amount of fumaric acid is reacted with twice the molar concentration of a base, said base being selected from the group consisting of ammonia, a primary amine of the formula $RNH_2$, a secondary amine of the formula $RR'NH$ and a tertiary amine of the formula $RR'R''N$ wherein R, R' and R'' are selected from a group consisting of $C_1$ to $C_4$ alkyl and alkylene groups, with said substantially non-aqueous electrolyte composition being free of unreacted fumaric acid, and wherein the total molar concentration of said fumaric acid and said base used to form the reaction product is less than about 0.3 mole per mole of said ethylene glycol and said electrolyte composition having a pH of between about 4.9 to 7.2 to prevent corrosion of the aluminum-anode.

2. The electrolyte composition in accordance with claim 1 further including a stabilizing agent selected from the group consisting of a boric acid, phosphoric acid, ammonium dihydrogen phosphate, ammonium pentaborate, ammonium phosphate and mixtures thereof.

3. The electrolyte composition in accordance with claim 1 wherein said reaction product is formed from between 0.001 to about 0.1 mole of said fumaric acid per mole of said ethylene glycol.

4. The electrolyte composition in accordance with claim 1 wherein said base is triethylamine.

* * * * *